US006727505B2

(12) United States Patent
Benke et al.

(10) Patent No.: US 6,727,505 B2
(45) Date of Patent: Apr. 27, 2004

(54) METHOD AND SYSTEM FOR DETERMINING DEPTH DISTRIBUTION OF RADIATION-EMITTING MATERIAL LOCATED IN A SOURCE MEDIUM AND RADIATION DETECTOR SYSTEM FOR USE THEREIN

(75) Inventors: Roland R. Benke, Helotes, TX (US); Kimberlee J. Kearfott, Ann Arbor, MI (US); Douglas S. McGregor, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 10/299,447

(22) Filed: Nov. 19, 2002

(65) Prior Publication Data

US 2003/0136916 A1 Jul. 24, 2003

Related U.S. Application Data

(62) Division of application No. 09/549,994, filed on Apr. 14, 2000, now Pat. No. 6,528,797.
(60) Provisional application No. 60/129,837, filed on Apr. 16, 1999.

(51) Int. Cl.[7] ................................................ G01T 1/20
(52) U.S. Cl. .................... 250/393; 250/394; 250/363.1
(58) Field of Search ................... 250/393, 394, 250/370.01, 370.13, 370.07, 363.1, 363.04, 358.1, 253

(56) References Cited

U.S. PATENT DOCUMENTS

| | | | |
|---|---|---|---|
| 3,612,865 A | 10/1971 | Walker | |
| 3,790,782 A | 2/1974 | Inoue et al. | |
| 3,979,594 A | 9/1976 | Anger | |
| 4,197,460 A | 4/1980 | Anger | |
| 4,247,770 A | * 1/1981 | Welch | 250/253 |
| 4,394,576 A | 7/1983 | Tanaka et al. | |
| 4,814,711 A | * 3/1989 | Olsen et al. | 324/331 |
| 5,214,281 A | * 5/1993 | Rowe | 250/253 |
| 5,429,135 A | 7/1995 | Hawman et al. | |
| 5,442,180 A | 8/1995 | Perkins et al. | |
| 5,616,925 A | * 4/1997 | Rhiger et al. | 250/370.13 |
| 5,665,970 A | 9/1997 | Kronenberg et al. | |
| 5,773,829 A | 6/1998 | Iwanczyk et al. | |
| 5,870,191 A | 2/1999 | Shirley et al. | |
| 6,518,579 B1 | * 2/2003 | Xu et al. | 250/393 |

OTHER PUBLICATIONS

Shookley, W., Currents to Conducters Induced by a Moving Point Charge, vol. 9, Oct. 1938.
Pamo, Simon, Currents Induced by Electron Motion, Proceedings of the I.R.E., Sep. 1939.
Day, R. B., et al., Noise, Trapping and Energy Resolution in Semiconductor Gamma–Ray Spectrometers, Henck and Coche: Noble Gas Scintillators, Los Alamos Scientific Laboratory, University of California, Feb. 1967.
Knoll, G.F., et al., Fundamentals of Semiconductor Detectors For Ionizing Radiation, Mat. Res.Soc. Symp. Proc., vol. 302, 1993.
Hecht, Karl, Zum Mechanismus des Lichtelektrischen Primarstromes in Isolierenden Kristallen, May, 23, 1932.

(List continued on next page.)

*Primary Examiner*—Constantine Hannaher
*Assistant Examiner*—Otilia Gabor
(74) *Attorney, Agent, or Firm*—Brooks Kushman P.C.

(57) ABSTRACT

A radiation detector system includes detectors having different properties (sensitivity, energy resolution) which are combined so that excellent spectral information may be obtained along with good determinations of the radiation field as a function of position.

5 Claims, 5 Drawing Sheets

OTHER PUBLICATIONS

McGregor, D.S., et al., Geometrically Weighted Semiconductor Frisch Grid Radiation Spectrometers. Elsevier Science B.V., 1999.

McGregor, D.S., et al., Performance of CdZnTe Geometrically Weighted Semiconductor Frisch Grid Radiation Detectors, IEEE Transactions on Nuclear Science, vol. 46, No. 3, Jun. 3, 1999.

Barrett, H.H., et al., Charge Transport in Arrays of Semiconductor Gamma–Ray Detectors, The American Physical Society, Jul. 3, 1995.

McGregor, D.S., et al., CdZnTe Semiconductor Parallel Strip Frisch Grid Radiation Detectors, IEEE Transactions on Nuclear Science, vol. 45, No. 3, Jun. 1998.

Viala, M, et al., A Camera Based Augmented–Reality System For Teleoperation In Nuclear Environments, Proceedings of ICON 5: 5$^{th}$ International Conference on Nuclear Engineering, Nice, France, May 26–30, 1997.

Rocheleau, David N., et al., Development of a Graphical Interface For Robotic Operation In A Hazardous Environment, IEEE, 1991, pp. 1077–1081.

Knight, Travis W., et al., Virtual Radiation Fields–A Virtual Environment Tool For Radiological Analysis and Simulation, Nuclear Technology, vol. 117, pp. 255–266, Feb. 1997.

Bullitt, E., et al., Three–Dimensional Reconstruction of Curves From Pairs of Projection Views in the Presence of Error. I. Algorithms, Am. Assoc. Phys. Med. vol. 24 (11), pp. 1671–1678, Nov. 1997.

Bullitt, E., et al., Three–Dimensional Reconstruction of Curves From Pairs of Projection Views in the Presence of Error. II. Analysis of Error, Am. Assoc. Phys. Med., vol. 24 (11), pp. 1679–1687, Nov. 1997.

Chen, Shiuh–Yung James, et al., Improved Determination of Biplane Imaging Geometry From Two Projection Images and its Application to Three–Dimensional Reconstruction of Coronary Arterial Trees, Am. Assoc. Phys. Med., vol. 24 (5), pp. 633–654, May 1997.

* cited by examiner

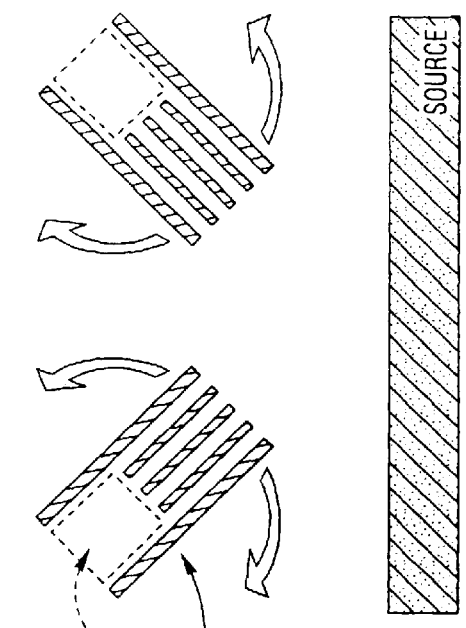
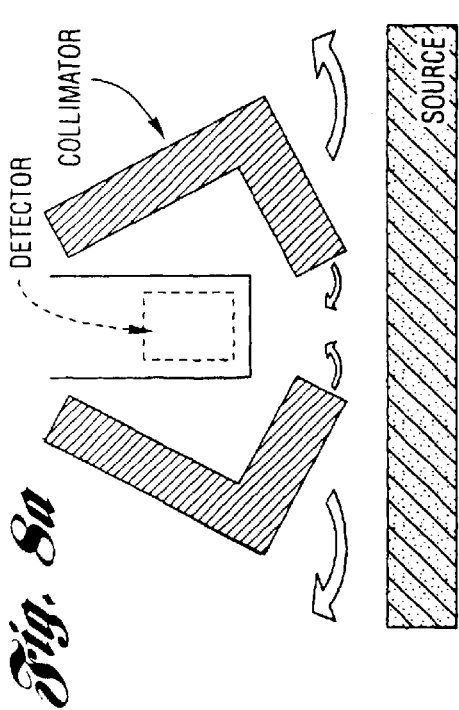
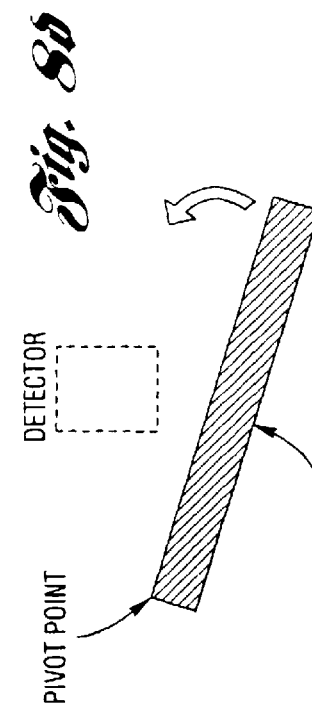
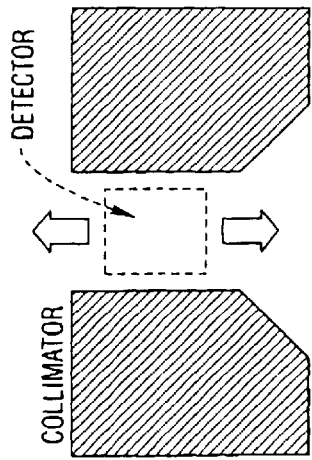

METHOD AND SYSTEM FOR DETERMINING DEPTH DISTRIBUTION OF RADIATION-EMITTING MATERIAL LOCATED IN A SOURCE MEDIUM AND RADIATION DETECTOR SYSTEM FOR USE THEREIN

CROSS-REFERENCE TO RELATED APPLICATION

This application is a divisional application of application No. 09/549,994 filed Apr. 14, 2000 now U.S. Pat. No. 6,528,797 which claims the benefit of U.S. provisional patent application entitled "Augmented Reality Radiation Display System and In Situ Spectrometry Method for Determining the Depth Distribution of Radionuclides" filed Apr. 16, 1999 and having U.S. Ser. No. 60/129,837.

GOVERNMENT RIGHTS

This invention was made with government support under Contract No. DE-AC05-76OR00033 awarded by the U.S. Department of Energy. The government has rights in the invention.

TECHNICAL FIELD

This invention relates to methods and systems for determining depth distribution of radiation-emitting material located in a source medium and radiation detector system for use therein.

BACKGROUND ART

In principle, in situ gamma-ray spectrometry determines the quantities of radionuclides in some source medium with a portable detector. In comparison, the more established method of laboratory gamma-ray spectroscopy consists of taking small samples of the medium into the laboratory for gamma-ray analysis. In situ gamma-ray spectrometry characterizes a larger volume of material, requires less time to determine accurate radionuclide concentrations, and minimizes worker doses and the risk of radioactive contamination. The main limitation of in situ gamma-ray spectrometry lies in determining the depth distribution of radionuclides.

In general, radionuclide depth distributions aid conventional in situ gamma-ray spectrometry in determining accurate radionuclide inventories and surface does rates from individual radionuclides. Depth distributions also represent reliable data for radionuclide transport studies. Indications of neutron or energetic charged particle fluxes can result from determinations of the activation as a function of material depth. For decontamination and decommissioning activities, the radionuclide depth distribution determines the amount of material that must be remediated to satisfy the release limits.

To date, three in situ gamma-ray spectroscopic methods have been used to determine the depth distribution of radionuclides in soil and are presented hereinbelow. These three in situ methods are based on multiple photopeak responses, the photopeak-to-valley ratio, and the attenuation of a lead plate as illustrated in FIGS. 1a and 1b. Each method requires a priori assumptions of the depth distribution function and uses a gamma-ray spectrometer. Spectrometers allow the users to decipher the energies of gamma-ray emissions, a necessity for determining the specific radioisotope present. In addition to usually assuming a uniform soil density with depth, all three approaches for determining depth distributions also assume a spatially uniform radionuclide distribution. All three in situ methods require a priori assumptions of the functional form for the depth distribution. The multiple photopeak and peak-to-valley methods only have the ability of determining a single depth parameter. An exception exists if the radionuclide of interest emits three or more significant gamma-rays, decently separated in energy, and if the spectrometer used has sufficient energy resolution to identify and separate each gamma-ray emission. In such cases, the multiple photopeak method could determine one fewer number of depth parameters than the number of significant gamma-rays emissions. The subsurface maxima exhibited by aged $^{137}$Cs fallout in soil are best described by at least two depth parameters and can not be adequately characterized by a single depth parameter. Table 1 summarizes the advantages and disadvantages of the three in situ methods.

TABLE 1

GENERAL ADVANTAGES AND DISADVANTAGES OF THE THREE STANDARD IN SITU METHODS FOR DETERMINING RADIONUCLIDE DEPTH DISTRIBUTIONS

| Method | Advantages | Disadvantages |
| --- | --- | --- |
| Multiple Photopeak | Requires a single measurement at each site | Requires at least two significant gamma-ray emissions<br>Gamma-ray emissions must have a large separation in energy<br>Depth information limited by the gamma-ray decay scheme of the radionuclide of interest<br>Multiple measurements at the same site yield no additional depth information |
| Peak-to-Valley Ratio | Requires only one significant gamma-ray emission<br>Requires a single measurement at each site | Sensitive to interference in complex gamma-ray fields<br>Multiple measurements at the same site yield no additional depth information |
| Lead Plate | Requires only one significant gamma-ray emission<br>Multiple measurements at the same site yield additional depth information | Requires multiple measurements at each site<br>Adds weight to the portable system |

In addition to the three in situ methods for determining depth distributions, spectroscopic measurements in boreholes have also been studied for applications in oil wells. Because boring itself qualifies as an invasive process, borehole measurements should be considered a quasi-in-situ approach. In addition to increased contamination risks, borehole measurements require boring equipment and custom fabricated detection equipment (extended cryostat lengths for HPGe detectors).

Three other imaging techniques include: pinhole collimation, coded aperture imaging, and Compton scatter imaging. The main limitation, common to all three of these imaging techniques, is the energy resolution of the detectors used. These other imaging techniques utilize position-sensitive detector arrays, which typically are large scintillation crystals with insufficient energy resolution for complex gamma-ray fields. For characterizing low levels of radioactivity, advancements in position-sensitive semiconductor detectors have not yet yielded devices that are large enough for adequate sensitivities or affordable enough for a rugged and portable in situ system.

U.S. Pat. No. 4,197,460 to Anger discloses a collimator assembly used to perform multi-angle nuclear imaging and the results are used to estimate relative depth of objects. Multi-angle display circuits divide the probe radiation image into different regions.

U.S. Pat. No. 3,979,594 to Anger discloses how relative positions of radiation sources at different depths are estimated via a focused collimator. Multiple-channel collimators are mentioned as an option to be used.

U.S. Pat. No. 5,429,135 to Hawman et al. discloses how a focusing collimator detects the depth of an organ in nuclear medicine.

U.S. Pat. No. 5,442,180 to Perkins et al. discloses an apparatus for determining the concentration of radioactive constituents in test samples (such as surface soil) by means of a real-time direct readout.

Other U.S. patents of a more general interest include: U.S. Pat. Nos. 4,394,576; 5,773,829; and 5,870,191.

The primary measurement problem which is not solved by the prior art is the in situ determination of the depth distribution of gamma-ray emitting radionuclides in source media. Contaminated soil and activated concrete are common examples of anthropogenic radionuclides in large area geometries. For these measurement situations, the gamma-ray spectrum tends to be complex due to the presence of multiple-radionuclides (natural or anthropogenic in origin). Therefore, the spectrometers used in the field must possess excellent energy resolution to minimize the deleterious effects of interfering gamma-ray emissions. Other practical issues are that an in situ detection system should be portable and rugged. Because it is not uncommon for low levels of anthropogenic radionuclides to be present in smaller quantities than natural radionuclides, it is important that the detection system also possess a sufficient gamma-ray detection efficiency for reasonable counting times.

DISCLOSURE OF INVENTION

An object of the present invention is to provide a method and system for determining depth distribution of radiation-emitting material located in a source medium and a radiation detector system for use therein wherein the invention can be used with respect to any source medium as long as its attenuation properties are insignificant, known, measurable, or estimable in any way.

Another object of the present invention is to provide a method and system for determining depth distribution of radiation-emitting material located in a source medium and a radiation detector system for use therein wherein in situ radiation measurements are performed such as gamma-ray spectrometry and offer a superior ability for characterizing complex depth distributions.

Still another object of the present invention is to provide a method and system for determining depth distribution of radiation-emitting material located in a source medium and a radiation detector system for use therein wherein the radiation-emitting material is radionuclides.

Yet still another object of the present invention is to provide a method and system for determining depth distribution of radiation-emitting material located in a source medium and a radiation detector system for use therein wherein conventional radiation detection equipment can be employed.

Yet still another object of the present invention is to provide a method and system for determining depth distribution of radiation-emitting material located in a source medium and a radiation detector system for use therein wherein the depth distribution is calculated without a priori knowledge about the depth distributions without required a priori selection of a specific functional form for the depth distribution and without the need for invasive core samplings.

In carrying out the above objects and other objects of the present invention, a method for determining depth distribution of radiation-emitting material located in a source medium is provided. The method includes detecting radiation emitted by the material within selected ranges of polar angles relative to a detector axis which is substantially perpendicular to an outer surface of the source medium to produce a plurality of corresponding electrical signals. The method also includes processing the plurality of electrical signals to obtain the depth distribution of the radiation-emitting material in the source medium.

The radiation may include x-ray emissions and/or gamma-ray emissions.

The material may be radionuclides or is energized so that the material emits the radiation.

The source medium may be soil or building materials such as concrete and/or steel.

The source medium may be an airborne plume.

The step of detecting is preferably at least partially performed with a detector having intrinsic efficiency and angular response and wherein the step of processing processes data representing the intrinsic efficiency and the angular response with the electrical signals to obtain the depth distribution.

In further carrying out the above objects and other objects of the present invention, a system for determining depth distribution of radiation-emitting material located in a source medium is provided. The system includes at least one detector assembly for detecting radiation emitted by the material within selected ranges of polar angles relative to a detector axis which is substantially perpendicular to an outer surface of the source medium to produce a plurality of corresponding electrical signals. The system also includes a signal processor for processing the plurality of electrical signals to obtain the depth distribution of the radiation-emitting material in the source medium.

The detector assembly may include a radiation detector and a radiation shield which surrounds the radiation detector, wherein the at least one detector assembly is adjustable to allow the radiation detector to detect radiation within the selected ranges of the polar angles and the radiation shield substantially blocks radiation outside the selected ranges of the polar angles.

The shield may be a collimator which is cylindrically symmetrical.

The collimator may include a plurality of collimator pieces which can be assembled into a plurality of geometric arrangements corresponding to the ranges of polar angles.

The collimator may be adjustable into a plurality of geometric arrangements corresponding to the ranges of polar angles.

The at least one detector assembly may be a radiation spectrometer.

The at least one detector assembly may include at least one of an array of detectors, a position-sensitive detector and a scanning detector.

The collimator may be movable relative to the detector.

For example, the collimator may include at least one collimator piece which is pivotally movable relative to the detector.

A pair of detector assemblies allow the system to focus at a selected depth of the source medium.

The collimator may be linearly movable relative to the detector.

The collimator may be cylindrically symmetrical about the detector.

The at least one detector assembly could have a relatively narrow field of view that is capable of being directed at a desired polar angle for a measurement and is rotatable about the detector axis. The same effect can also be accomplished with rotating the entire detector assembly, with a narrow field of view and at a fixed-polar angle, about the normal of the source surface.

Still further in carrying out the above objects and other objects of the present invention, a radiation detector system is provided. The system includes at least one central radiation detector for converting ionizing radiation into a first signal. The system also includes at least one satellite radiation detector positioned adjacent the at least one central radiation detector for converting ionizing radiation into at least one second signal. The system further includes at least one radiation shield disposed adjacent the at least one satellite radiation detector to substantially block ionizing radiation originating outside a field of view of the at least one satellite radiation detector. The first signal and the at least one second signal represent a spectral fingerprint of an area and spatial distribution of an ionizing radiation source within the area.

The satellite radiation detectors may be spectroscopic radiation detectors.

The ionizing radiation may include gamma rays wherein the system is a position-sensitive, compound gamma ray spectrometer.

The central radiation detector preferably includes a semiconductor substrate.

Radionuclides represent one of the most significant contamination problems for the Department of Energy (DOE). Implementation of this invention would decrease the risk of the public and workers to radiation and significantly reduce the cost and time of radiation characterization activities. As a powerful tool for radionuclide characterization and verification of remediation, this invention is immediately applicable to the widespread radionuclide cleanup activities of soil contamination as well as activated or contaminated building materials (such as concrete or steel) across the DOE complex and commercial nuclear power industry. This invention could also determine vertical or horizontal distributions of radionuclides in airborne plumes or be applied to borehole measurements for determining radionuclide depth distributions. Modifications could be made for the characterization of contamination in laboratories and for other geometries, such as tanks, drums, pipes, etc.

Conventional in situ gamma-ray spectrometry uses an unshielded gamma-ray detector placed 1 m above the soil surface. This invention implements a unique collimator with conventional or unconventional radiation detection equipment. A cylindrically symmetric collimator is positioned so that its axis is normal to surface of the area source and surrounds the detector and allows only those gamma-rays emitted from a selected range of polar angles (measured off the detector axis) to be detected. Adjustment of the collimator enables the detection of gamma-rays emitted from a different range of polar angles and preferential depths. Assuming a spatially uniform radionuclide distribution (in the plane normal to the collimator axis) within each depth increment and any radionuclide depth distribution (uniform or otherwise) within each depth increment, the unattenuated or uncollided gamma-ray flux from each depth increment can be calculated and paired with the intrinsic efficiency and angular response of the detector to yield a detector response matrix over the selected depth increments and range of measured polar angles. The uncollided or unattenuated gamma-rays are those gamma-rays which are emitted from a radionuclide and do not interact in the material between the radionuclide and the detector.

The present invention is an improvement over the lead plate method of FIGS. 1$a$ and 1$b$. By avoiding the summing effect of large and small polar angles from moving a simple lead plate farther from the detector, the present invention exhibits a smaller measurement error. In addition, the present invention's angled edges allow for more effective shielding of those radiations emitted outside of the polar angle range and allow for a more straightforward response calculation.

This invention offers superior sensitivity, easier operation, and greater robustness requiring less maintenance under rugged conditions as compared with the prior art.

Each measurement of a particular range of polar angles is performed with a different combination of the collimator pieces or by setting a single adjustable collimator to a similar geometry. The matrix equation for determining the detector response for each collimator setup could take the following form:

$$m = Hd$$

where m is column vector for the detector response or measured photopeak count rate at each range of polar angles, H is the detector response matrix for each combination of polar angle and depth increment and represents the photopeak count rate from a unit radionuclide specific activity in a specific depth increment for a specific collimator setup, and d is a column vector for the radionuclide depth distribution (radionuclide specific activity in units of Bq per gram of material in each depth increment for example). Calculation of the depth distribution follows from solution of the following matrix equation:

$$d = H^+ m$$

where $H^+$ is the matrix such that $H^+m = H^+Hd = d$ (note that $H^+$ is called the inverse of the detector response matrix, H, when H is a square matrix such that the column vectors m and d are of the same dimension). Therefore, processing of the measured angular data in m yields a reconstruction of the radionuclide distribution with depth, d.

It should be noted that improvements in the depth distribution determinations could be obtained from (a) increasing the collimated measurements to invoke an overdetermined situation (oversampled method), and (b) from simplifying the response matrix by neglecting the elements of the matrix that are small with respect to the other elements for a particular polar angle measurement. In addition to analytical calculations and actual measurements, the response matrix can also be computed from Monte Carlo computer simulations.

The elements of the invention which are new compared to the current prior art are:

defining independent spatially uniform depth increments each with a uniform or any other depth radionuclide distribution within each depth increment;

using a cylindrically symmetric collimator to allow significant detector photopeak response over a small range of polar angles and negligible photopeak response for gamma-rays incident on the detector at polar angle outside of the small range; and determining the detector response for a small range of polar angles from a unit radionuclide source in each depth increment (defining the detector response matrix).

Instead of using a single gamma-ray spectrometer with several different collimator setups, simultaneous angular measurements could be performed with a position sensitive detector, array of detectors, or scanning detectors. Instead of several fixed collimator pieces, a single mechanically adjustable collimator could achieve the different collimator setups.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIGS. 8a–8d schematically show three alternative collimator/detector assembly geometries: FIG. 8a shows a movable collimator with a fixed detector, FIG. 8b shows a dual detector design with movable on-axis collimator to allow the system to focus at a particular depth, FIG. 8c shows a system where the detector can be moved with respect to a fixed collimator, and FIG. 8d shows a simple pivoting design as an alternative to vertical movements of the collimator with respect to the detector and source surface.

BEST MODE FOR CARRYING OUT THE INVENTION

Figure 1A:
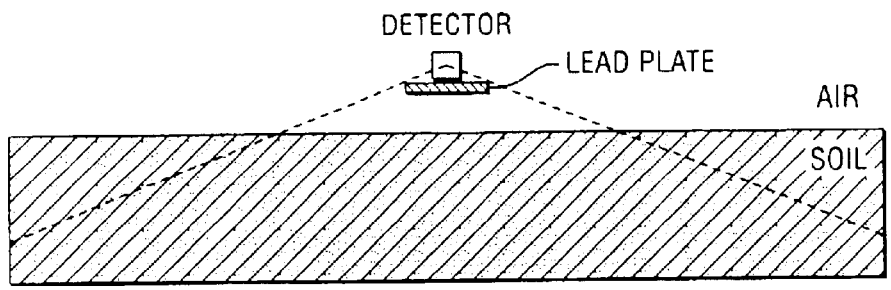
FIGS. 1a and 1b are cross-sectional views of a prior art in situ gamma-ray spectrometry setup with a lead plate located at two different distances from the detector, the detector predominately responds to those gamma-rays emitted from radionuclides located outside the dashed lines; for a lead plate location close to the detector, as shown in FIG. 1a, the detector preferentially responds to those radionuclides contained within the shallower layers of soil; for a large lead plate at a distance from the detector, as shown in FIG. 1b, the detector is shielded from those radionuclides located directly beneath the lead plate, and a larger volume of soil contributes to the detector response.
Figure 1B:
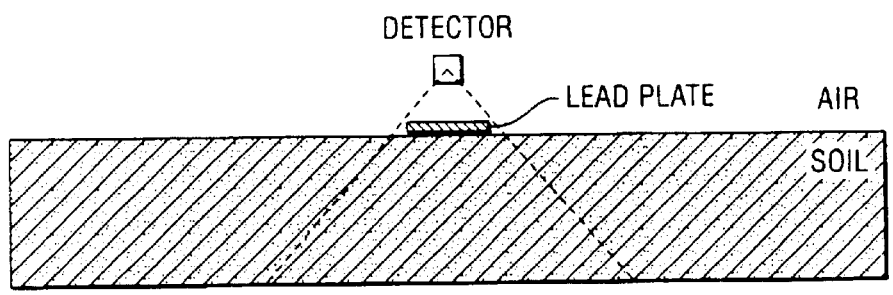

The method and system of the present invention preferably employ a unique collimator design used with conventional radiation detection equipment. The cylindrically symmetric collimators disclosed herein are designed to allow only those gamma-rays emitted from a selected range of polar angles (measured off the detector axis) to be detected. The collimators are positioned with their axes normal to surface of the media, and multiple collimator measurements detect gamma-rays emitted from different ranges of polar angles and preferential depths.

The method and system of the invention also includes sectioning the measured medium into several independent depth layers. Although other distributions within each depth layer could also be assumed, a uniform radionuclide distribution is assigned to each depth layer. After the source medium is sectioned into depth layers, system-of-response equations are created relating the measured photopeak count rates with the different collimators to the activities contained within the depth layers. Solving the system-of-response equations for the in situ spectrometer measurements using the different collimators enables reconstructions of the radionuclide depth distribution. While previous in situ methods rely on a priori assumptions of the depth distribution shape, the approach described herein calculates the depth distribution in a histogram format without fitting the depth distribution to a preassigned function. Because the method and system of the invention only requires the net photopeak count rates from the collected gamma-ray spectra, the method and system of the invention are virtually unaffected by scattered gamma-rays from the radionuclide of interest or from other radionuclides.

Theory and Methodology

Whereas conventional in situ gamma-ray spectrometry uses an unshielded gamma-ray detector positioned 1 m above the soil surface, the method and system of the present invention implements a unique collimator to be used at the surface with conventional in situ equipment. A cylindrically symmetric collimator, positioned so that its axis is normal to the surface of the area source, surrounds the detector and allows only those gamma-rays emitted from a selected range of polar angles (measured off the collimator axis) to be detected. Adjustment of the collimator enables detection of gamma-rays emitted from a different range of polar angles and preferential depths. Processing of the data from different angles yields a reconstruction of the radionuclide distribution with depth. Collimation is used to obtain radionuclide depth distribution information from in situ gamma-ray measurements.

Uncollided Gamma-ray Flux Calculations for a Uniformly Distributed Source

In this section, the total uncollided gamma-ray flux for a single gamma-ray energy incident at an in situ detector is derived for uniform source distribution in soil. The specific situations of limiting and the polar angle as well as limiting the depth of soil are introduced, and their impact on the gamma-ray flux is derived. Derivations of in situ gamma-ray spectrometry calibration factors have been addressed in several publications (Beck et al. 1972; Helfer and Miller 1988; ICRU 1994). The geometry of in situ gamma-ray spectrometry is presented in FIG. 2 wherein r is the distance from the surface of the detector to a single radionuclide contained within an infinitesimal volume of soil in units of cm, $\theta$ is the off-axis polar angle of the radionuclide measured from the axis of the detector in units of radians, and h is the height of the detector above the soil surface in units of cm.

Figure 2:
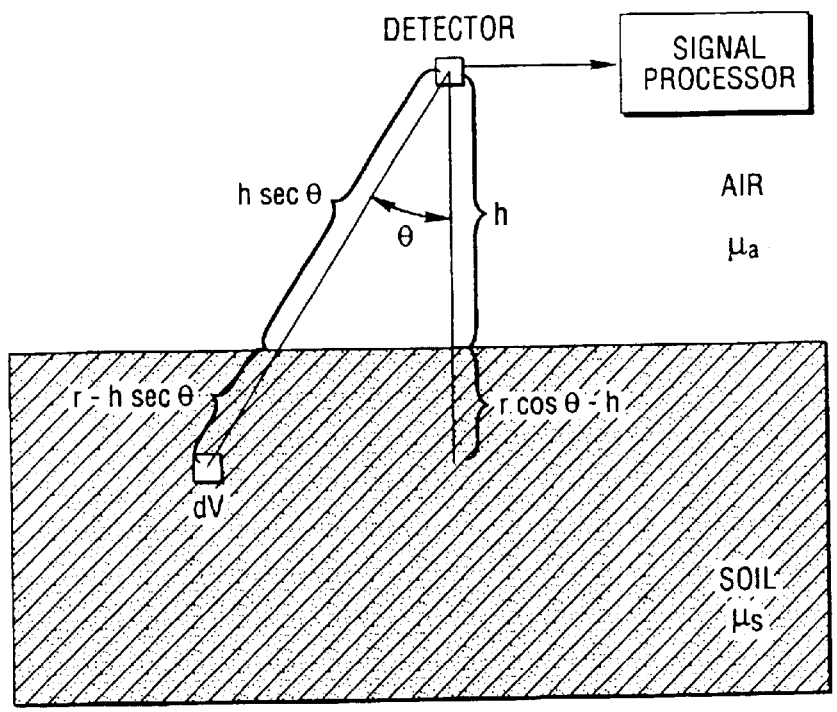
FIG. 2 is a cross-sectional schematic view of the in situ gamma-ray spectrometry geometry, wherein r is the distance from the detector to a radionuclide contained within an infinitesimal volume of soil in units of cm, $\theta$ is the off-axis polar angle of the radionuclide measured from the axis of the detector in units of radians, h is the height of the detector above the soil surface in units of cm, $\mu_a$ is the linear gamma-ray attenuation coefficient for air in units of $cm^{-1}$, dV is an infinitesimal volume of soil, and $\mu_s$ is the linear gamma-ray attenuation coefficient for soil in units of $cm^{-1}$.

As shown in FIG. 2, a cylindrical detector is positioned so its axis is normal to the measurement surface. The polar angles are measured off the axis of the cylindrical detector and from the center of the detector crystal. To enable greater counting efficiencies and improved system sensitivity, the collimator design allows contributions from the entire azimuthal field of view. The azimuthal angle is defined as the angle of rotation about the axis of the detector. By allowing a full azimuthal field of view, larger volumes of source media are characterized with each collimator measurement, thereby offering a more representative result as well as reducing the required counting times.

Computing the total gamma-ray flux at the detector from a volume source requires triple integration of an infinitesimal volume of soil. Accounting for the gamma-ray attenuation from the soil and air, the total uncollided gamma-ray flux becomes:

$$\phi_{total}^{uniform} = \int_0^{2\pi} \int_0^{\frac{\pi}{2}} \int_{h\sec\theta}^{\infty} \frac{S_v}{4\pi r^2} e^{-\mu_s(r-h\sec\theta)} e^{-\mu_a(h\sec\theta)} r^2 \sin\theta \, dr \, d\theta \, d\varphi \quad (1)$$

where $S_v$ is the gamma-ray emission rate per unit volume of soil with units of $\gamma \, s^{-1} \, cm^{-3}$ $\mu_s$ is the soil attenuation coefficient in units of $cm^{-1}$, $\mu_a$ is the air attenuation coefficient in units of $cm^{-1}$, and $\phi$ is the azimuthal angle in units of radians.

Breaking Equation (1) into parts, $\frac{S_v}{4\pi r^2}$ represents the flux a distance r from a point source, $e^{-\mu_s(r-h\sec\theta)}$ represents the soil attenuation, $e^{-\mu_a(h\sec\theta)}$ represents the air attenuation, and $r^2 \sin\theta \, dr \, d\theta \, d\phi$ represents the Jacobian for an infinitesimal volume of soil, dV. The flux per unit polar angle can be obtained by integrating Equation (1) with respect to r and $\phi$ resulting in:

$$\frac{d\phi}{d\theta} = \frac{S_v}{2\mu_s} \sin\theta \cdot e^{-\mu_a h \sec\theta}. \quad (2)$$

To obtain the total flux, Equation (2) will be integrated over polar angle, $\theta$:

$$\phi_{total}^{uniform} = \frac{S_v}{2\mu_s} \int_0^{\frac{\pi}{2}} \sin\theta \cdot e^{-\mu_a h \sec\theta} \, d\theta. \quad (3)$$

Making a change of variables, results in:

$$\phi_{total}^{uniform} = \frac{S_v}{2\mu_s} \int_1^{\infty} \frac{e^{-\mu_a h \omega}}{\omega^2} \, d\omega. \quad (4)$$

where $\omega = \sec\theta$ and $\sin\theta \, d\theta = d\omega/\omega^2$ (knowing $d\omega = \sec\theta \tan\theta \, d\theta$).

Using the following definition of the exponential integral for n={0, 1, 2, 3, . . . } and for a real x>0:

$$E_n(x) = \int_1^{\infty} \frac{e^{-xt}}{t^n} \, dt, \quad (5)$$

with $t=\omega$, $n=2$, and $x=\mu_a h$, the total flux for a uniform source distribution becomes:

$$\phi_{total}^{uniform} = \frac{S_v}{2\mu_s} E_2(\mu_a h). \quad (6)$$

Using the exponential integral recurrence relation for n={1, 2, 3, . . . }:

$$E_{n+1}(x) = \frac{1}{n}[e^{-x} - x \cdot E_n(x)], \quad (7)$$

with n=1, the total flux for a uniform source distribution can take a slightly different appearance:

$$\phi_{total}^{uniform} = \frac{S_v}{2\mu_s} [e^{-\mu_a h} - \mu_a h \cdot E_1(\mu_a h)]. \quad (8)$$

Limited Angle Case

In this section, a derivation is performed for a case where the contributions to the uncollided gamma-ray flux are considered only from a reduced range of polar angle. For this limited polar angle case and for a uniform source distribution, Equation (4) takes the following form:

$$\phi_{limited}^{uniform} = \frac{S_v}{2\mu_s} \int_{\omega_1}^{\omega_2} \frac{e^{-(\mu_a h)\omega}}{\omega^2} d\omega. \tag{9}$$

where $\omega_1 < \omega_2$ (or $\theta_1 < \theta_2$). Manipulating the limits of integration, one knows:

$$\int_{\omega_1}^{\omega_2} \frac{e^{-(\mu_a h)\omega}}{\omega^2} d\omega = \int_{\omega_1}^{\infty} \frac{e^{-(\mu_a h)\omega}}{\omega^2} d\omega - \int_{\omega_2}^{\infty} \frac{e^{-(\mu_a h)\omega}}{\omega^2} d\omega. \tag{10}$$

Using Equation (10) and changing variables on the right-hand side (RHS) of Equation (10), such as $\omega' = \omega/\omega_1$ and $\omega'' = \omega/\omega_2$, restrictively, Equation (9) becomes:

$$\phi_{limited}^{uniform} = \frac{S_v}{2\mu_s} \left[ \frac{1}{\omega_1} \int_1^{\infty} \frac{e^{-(\mu_a \omega_1 h)\omega'}}{(\omega')^2} d\omega' - \frac{1}{\omega_2} \int_1^{\infty} \frac{e^{-(\mu_a \omega_2 h)\omega''}}{(\omega'')^2} d\omega'' \right] \tag{11}$$

Now using the definition of the exponential integral from Equation (5), the gamma-ray flux for the limited polar angle case from an exponential source distribution is:

$$\phi_{limited}^{uniform} = \frac{S_v}{2\mu_s} \left[ \frac{E_2(\mu_a \omega_1 h)}{\omega_1} - \frac{E_2(\mu_a \omega_2 h)}{\omega_2} \right] \tag{12}$$

Limited Depth Case

In addition to a reduced range of polar angle, the following offers a derivation for the contributions to the uncollided gamma-ray flux from a layer of soil of thickness t in cm at a depth of $z_{top}$ in cm from the soil surface. Integrating Equation (1) with respect to the azimuthal angle, $\phi$, simplifying and making two changes of variables results in:

$$\phi_{total}^{uniform} = \frac{S_v}{2} \int_0^{\infty} \int_1^{\infty} \frac{e^{-(\mu_s z + \mu_a h)\omega}}{\omega} d\omega dz \tag{13}$$

where $\omega = \sec \theta$ ($\sin \theta \, d\theta = d\omega/\omega^2$) and $z = r/\omega - h$ ($dr = \omega \, dz$). To account for the limited angle and depth cases, the limits of integration in Equation (13) become:

$$\phi_{layer}^{uniform} = \frac{S_v}{2} \int_{\omega_1}^{\omega_2} \int_{z_{top}}^{z_{top}+t} \frac{e^{-(\mu_s z + \mu_a h)\omega}}{\omega} dz d\omega. \tag{14}$$

Integrating with respect to z, one has:

$$\phi_{layer}^{uniform} = \frac{S_v}{2\mu_s} \int_{\omega_1}^{\omega_2} \left\{ \frac{e^{-(\mu_s z_{top} + \mu_a h)\omega}}{\omega^2} - \frac{e^{-[\mu_s (z_{top}+t) + \mu_a h]\omega}}{\omega^2} \right\} d\omega. \tag{15}$$

Manipulating the limits of integration and making the same change of variables as was done in Equation (10) results in:

$$\phi_{layer}^{uniform} = \frac{S_v}{2\mu_s} \left[ \frac{1}{\omega_1} \int_1^{\infty} \frac{e^{-(D_{top}\omega_1)\omega'} - e^{-(D_{bot}\omega_1)\omega'}}{(\omega')^2} d\omega' - \frac{1}{\omega_2} \int_1^{\infty} \frac{e^{-(D_{top}\omega_2)\omega''} - e^{-(D_{bot}\omega_2)\omega''}}{(\omega'')^2} d\omega'' \right] \tag{16}$$

where $D_{top} = \mu_s z_{top} + \mu_a h$ and $D_{bot} = \mu_s (z_{top}+t) + \mu_a h$. Integrating Equation (16) yields the uncollided gamma-ray flux due to a limited polar angle from a single layer of soil with thickness t:

$$\phi_{layer}^{uniform} = \tag{17}$$
$$\frac{S_v}{2\mu_s} \left[ \frac{E_2(D_{top}\omega_1) - E_2(D_{bot}\omega_1)}{\omega_1} - \frac{E_2(D_{top}\omega_2) - E_2(D_{bot}\omega_2)}{\omega_2} \right].$$

Using Equation (17), uncollided gamma-ray fluxes are calculated for five polar angle ranges from five soil layers with a uniform (homogeneous) $^{137}$Cs distribution. Showing the limited angle and depth geometries, FIG. 3 also presents the percentages of the total uncollided gamma-ray flux, for a particular polar angle range, incident at the detector from each soil layer. As the polar angle is increased, the percentage of uncollided gamma-ray flux emitted from the upper soil layers increases. Therefore, large polar angle measurements can be used to characterize radionuclide activities in the lower soil layers. The radionuclide activities in each layer are independent and could be used to identify appropriate depth distribution functions, if such a refinement is deemed advantageous.

Design and Collimator Geometries

Figure 4:
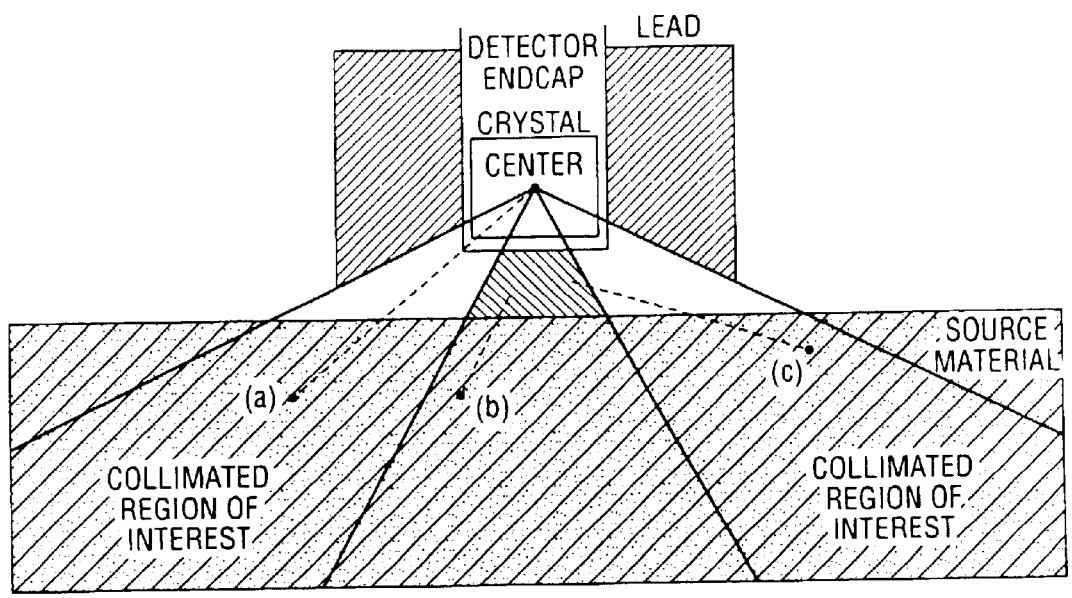
FIG. 4 is a cross-sectional view of a first embodiment of a collimator/detector assembly located on the source medium surface, those gamma-rays emitted within the collimate region of interest and within the polar angle range do not encounter lead attenuation along their path to the center of the detector crystal; three gamma-ray trajectories are depicted: a) emitted within the collimated region of interest and incident at the detector within the polar angle range encounters no lead attenuation, b) emitted outside the collimated region of interest within the polar angle range encounters lead attenuation, and c) emitted within the collimated region of interest and outside the polar angle range encounters lead attention.

The method and system of the present invention use gamma-ray collimation to limit the detector response to a small range of polar angles. A number of different cylindrically symmetric collimators are possible and may be fabricated using lead. FIG. 4 illustrates one such collimator. Each collimator is designed with sloping edges that matched the desired polar angle. Maximizing the gamma-ray path length through the lead, the sloping edges minimized the contributions from those gamma-rays emitted outside the collimated region of interest.

Simulations of uniform distribution of $^{137}$Cs in soil are used to select the polar angles for each collimator. For each range in polar angle, uncollided gamma-ray fluxes are calculated using Equation (17). The term "uncollided" refers to those gamma-rays that are emitted within the source media and do not interact in the material between the radionuclide source and the detector.

Adjusting the ranges of polar angle to yield similar uncollided gamma-ray fluxes resulted in the following ranges: 0–34°, 34–48°, 48–60°, 60–70°, and 70–80°. Assuming similar gamma-ray counting efficiencies for each collimator (which may be dependent on the actual detector employed), qualitative information about the depth distribution could be obtained by simply comparing the photopeak count rates from each collimator measurement. For instance, a photopeak count rate with the 70–80° collimator that was significantly larger than the 0–34° measurement would indicate a greater source distribution near the surface. Likewise, greater count rates with the 0–34° collimator would indicate a deeper depth distribution.

Figure 3:
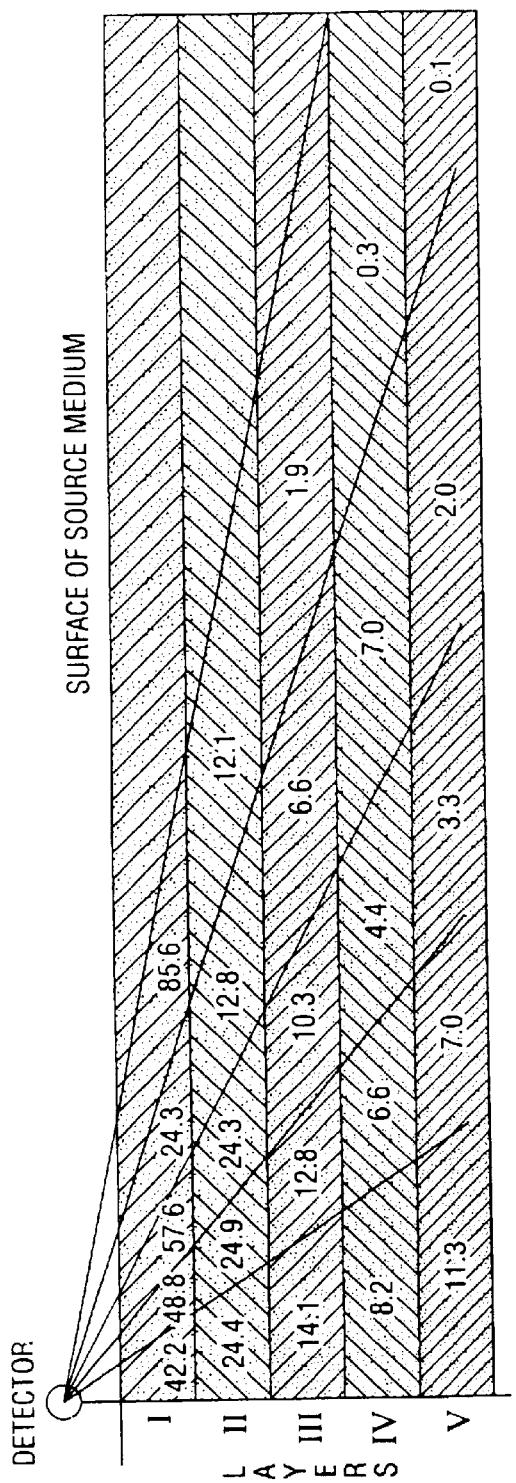
FIG. 3 is a cross-sectional view of the limited angle and depth in situ geometries for five polar angle ranges and five soil layers; due to size limitations, only the right-hand side of the cross-sectional view is displayed; a true cross-sectional view could also show a mirror image of the polar angles to the left of the axis (direction normal to the soil surface); based on uniform (homogenous) distribution of $^{137}Cs$ in soil having typical properties; the numbers represent the percentages of the total uncollided gamma-ray flux incident at the detector from each depth layer for a particular range of polar angles, the five polar angle ranges shown (not to scale) are 0–34°, 34–48°, 48–60°, 60–70°, and 70–80°.

Using Equation (17), uncollided gamma-ray fluxes are calculated for the previously selected polar angle ranges (0–34°, 34–48°, 48–60°, 60–70°, and 70–80°) from the five soil layers in FIG. 3. Depicting the limited angle and depth geometries, FIG. 3 also presents the percentages of the total uncollided gamma-ray flux, for a particular polar angle range, incident on the detector from each soil layer.

For example, calculations are based on a soil layer thickness of 4 cm, a detector height of 10.5 cm, a soil water content of 10%, a soil bulk density of 1.6 g cm$^{-3}$, a linear gamma-ray attenuation coefficient for soil at 662 keV of 0.125 cm$^{-1}$, and a linear gamma-ray attenuation coefficient for air at 662 keV of 0.0001 cm$^{-1}$. As the polar angle is increased, the percentage of uncollided gamma-ray flux incident from the upper soil layers increases. Therefore, large polar angle measurements characterize radionuclide activities in upper layers of soil. Subtracting the upper layers' contributions, the smaller polar angle measurements are used to determine radionuclide activities in the lower soil layers. The radionuclide activities in each layer are independent and can be used to identify appropriate depth distribution functions, if such a refinement is deemed advantageous.

The total number of radionuclide activity data points with depth (or depth parameters) can equal the number of polar angle ranges sampled. Alternatively, in an oversampled case one has more angles than depths; or in an undersampled case one can use other information to assist in the solution of the depth distribution. The cylindrical symmetry of each collimator section increases the system's sensitivity by allowing the detector to respond to larger volumes of source material. In addition to requiring shorter count times, the collimator's cylindrical symmetry also has the effect of averaging the radionuclide depth distribution over a much larger volume of material than that obtained from a typical laboratory analyzed sample.

FIG. 4 shows a cross-sectional view of one collimator/detector geometry. A prototype lead collimator has been designed which requires adjusting the collimator by changing individual lead pieces for each angular measurement. To reduce the manual work required in adjusting the lead collimator in between angular measurements, a multiple angle collimator consisting of a fixed collimator section with several detector locations as well as a movable collimator with a fixed detector location are possible. Constructing collimator with mechanically movable sections of thick lead which are cylindrically symmetric imply significant design challenges as well as reliability issues.

Figure 5:
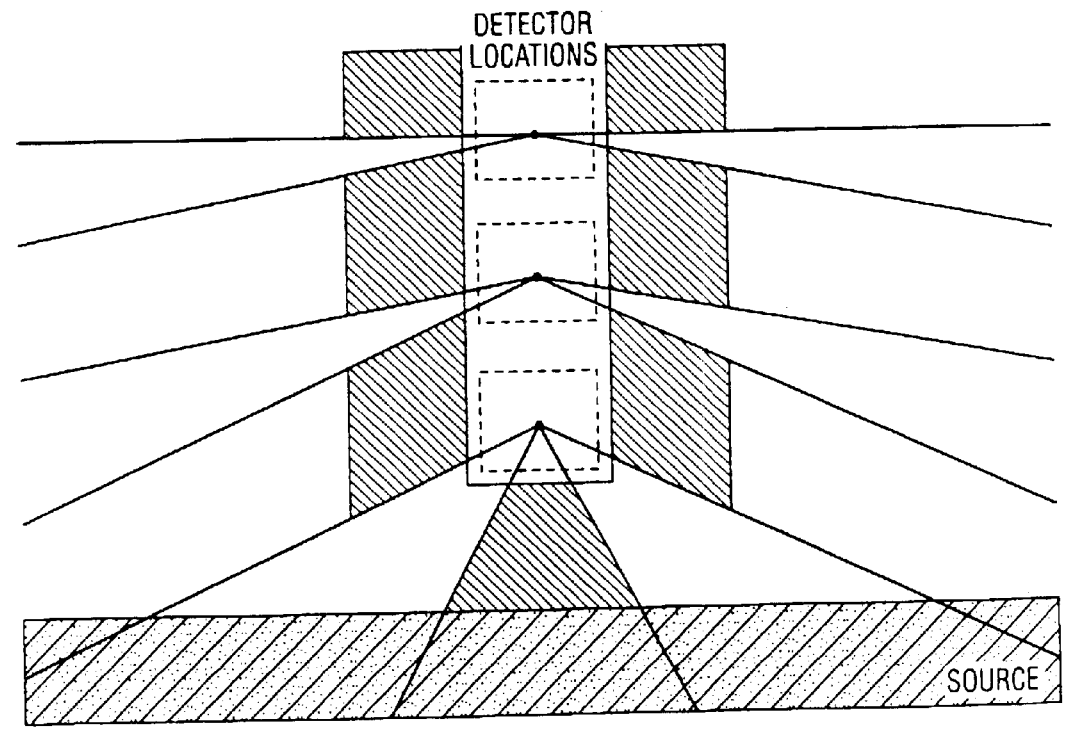
FIG. 5 is a cross-sectional view of a second embodiment of a collimator and movable detector assembly; the different polar angle ranges are measured by moving the detector to each of the dashed locations within the cylindrically symmetric collimator; alternatively each dashed location may represent a separate positional detector to allow 2-D or 3-D application.

Therefore, a multiple angle collimator consisting of a fixed collimator section with several detector locations seems more appropriate for the system and is presented in FIG. 5. Instead of moving lead pieces for each angular measurement, the detector is simply moved to a different location within the collimator shaft. In regard to characterizing the source material directly beneath the system (smaller polar angles), two possibilities have been presented. Both require the removal of the lowest (on-axis) section of the lead collimator.

Figure 6:
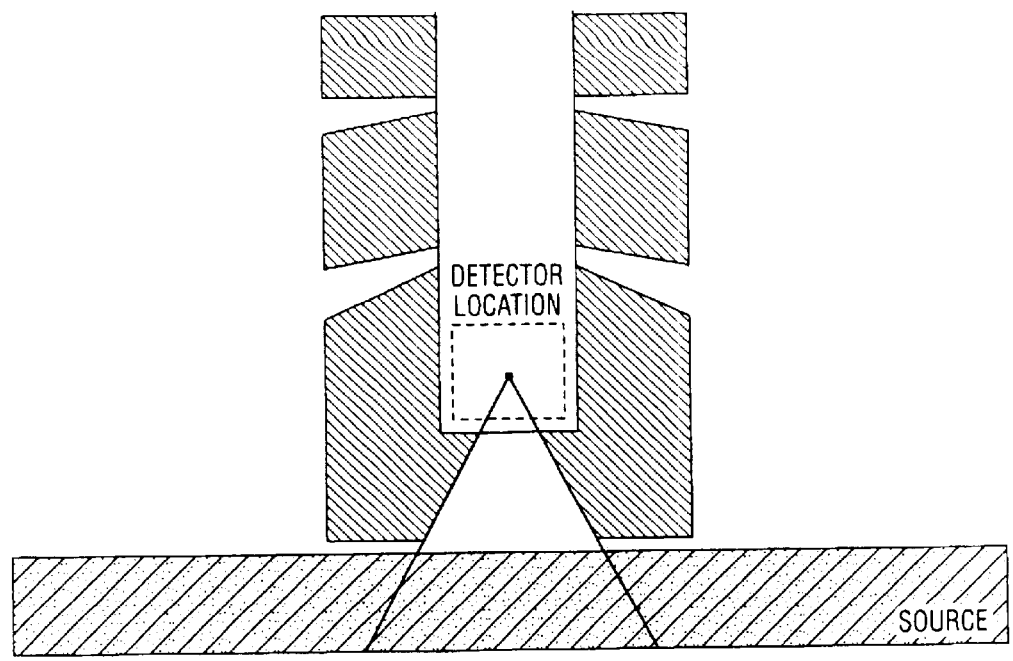
FIG. 6 is a cross-sectional view of a third embodiment of such an assembly wherein by switching lowest collimator section, the lowest detector position allows the measurement of those gamma-rays incident at small polar angles.
Figure 7:
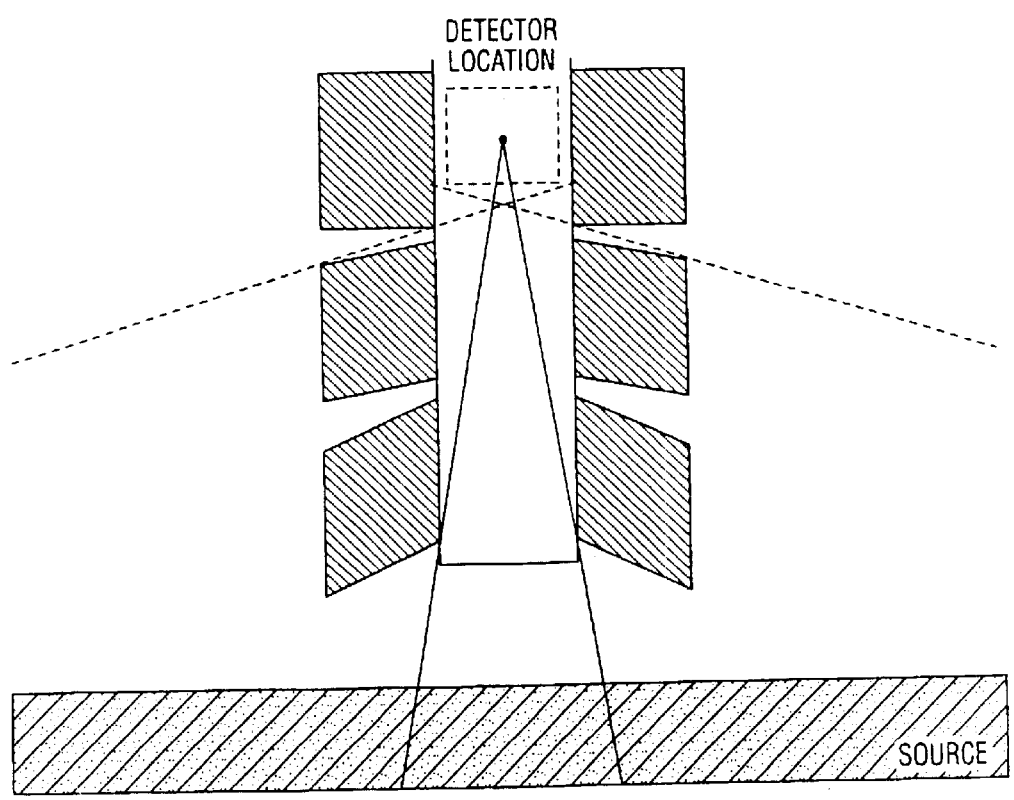
FIG. 7 is a cross-sectional view of a fourth embodiment of such an assembly wherein the detector is in its uppermost detector position; by removing the lowest collimator section, this detector position allows the measurement of those gamma-rays incident at small polar angles; the detector is positioned above the smallest polar angle passed by the uppermost collimator opening.

FIG. 6 suggests the addition of another lead section while the detector remains in the lowest location, and FIG. 7 suggests moving the detector to new upper location without requiring the placement of new lower lead section. The main disadvantage of the new upper detector location (FIG. 7) is that a longer detector cryostat would be required. Initial calculations suggest that four detector locations (FIG. 7) requires a typical portable detector cryostat to be lengthened by roughly 10 cm. Therefore, with a standard length cryostat, three detector positions and three removable lead collimator sections at the bottom of the collimator would be required to allow for five different angular measurements.

Other collimator/detector geometries are shown in FIGS. 8a–8d. FIG. 8a depicts a movable collimator with a fixed detector. However, constructing a collimator with mechanically movable sections of thick lead that are cylindrically symmetric implies significant design challenges. FIG. 8b shows a dual detector design with movable on-axis collimation, which allows the system to focus in on a particular depth. FIG. 8c displays a system where the detector can be moved with respect to a fixed cylindrical collimator or plate (or the collimator could be moved with respect to a fixed detector) to obtain the angular information.

FIG. 8d shows a simple pivoting design as an alternative to the vertical movements of FIG. 8c.

Limitations of any in situ gamma-ray spectrometry system depend on the specific radionuclide of interest. Depth information for radionuclides which only emit gamma-rays at very low energies (<100 keV) will be limited to the shallower layers of soil due to the increased self-attenuation of the soil. However, the system design parameters could be modified to specifically obtain greater depth information for low-energy gamma-ray emitters if deemed necessary. At the other extreme, radionuclides which emit gamma-rays at high energies (>2 MeV) would not impose such a limitation because the reduced detection efficiency for high energy gamma-rays would tend to be offset by a reduction in self-attenuation.

As an alternative to moving a single crystal detector to a different location for each measurement in FIGS. 5–7, a multiple detector system can simultaneously acquire data from several angles. This has the significant advantage of improving detection efficiency and therefore decrease measurement times. CdZnTe detector advancements allow for the fabrication of customized and compact detector arrays within the tight confines of the collimator. The detectors inserted in the collimator could be operated to give xy spatial dependence over the soil plane. Any other semiconductor besides CdZnTe, scintillator or other detectors or detector materials may also be used.

Figure 9:
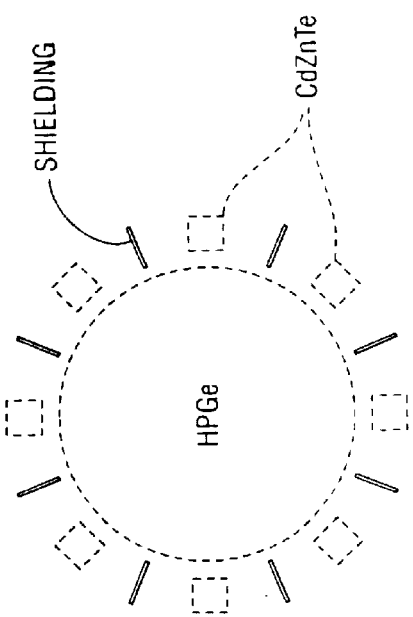
FIG. 9 is a top cross-sectional view of a multiple detector system; a larger HPGe detector is surrounded with a ring of CdZnTe detectors; shielding is placed in between each CdZnTe detector to reduce the gamma-ray contributions originating outside a "forward" field of view.

Referring to FIG. 9, a combination of two types of detectors having different energy resolution, sensitivity or other properties improve positional spectroscopic determinations. One way of doing this is to have a central detector having a high energy resolution, such as intrinsic germanium, surrounded by spectroscopic detectors having greater sensitivities (or which can be reasonably manufactured in larger pieces).

The inner detector, perhaps having a larger field of view than the outer detectors, determine (more precisely than the other, lower energy-resolution detectors) the average spectral fingerprint of the overall area, while providing information useful for analyzing the data from the other detectors.

The outer detectors provide information about the spatial distribution of the ionizing radiation sources; any spectral information from these detectors could also be utilized. The hybrid detectors could alternatively be manufactured in a curved geometry of some type.

As shown in FIG. 9, a ring of smaller CdZnTe devices can be wrapped around a core HPGe device to produce a compound gamma-ray spectrometer that is position sensitive. For instance, segmented rings of CdZnTe detectors are arranged around a large coaxial HPGe detector to give both radial position location (CdZnTe devices) and very high energy resolution (HPGe device). The bottom HPGe detector can have a segmented CdZnTe array on a xy plane to give further information as to the spatial distribution of source emissions directly beneath the device. The higher absorption efficiencies of the CdZnTe devices reduces the volume requirements, in which the CdZnTe devices should not interfere with the HPGe device performance. Properly placed collimator openings allow for measurements with and without the CdZnTe devices blocking the central HPGe devices. Miniaturized preamplifiers and readout electronics allow for the straightforward implementation of such a concept. The combination of spatial and depth distributions represents the first step in determining three-dimensional data of radionuclide distributions. Obviously, other detector arrangements may be provided. For example, one or more of the satellite detectors could be a single ring of positional detectors. The position of the higher energy resolution detectors and the higher spatial resolution detectors could be reversed.

Current in situ methods only have the ability to fit simple depth distributions and provide no spatial information. Therefore, the proposed system's ability to obtain three-dimensional distribution data represents an overwhelming advantage for radionuclide characterizations in soil.

While the best mode for carrying out the invention has been described in detail, those familiar with the art to which this invention relates will recognize various alternative designs and embodiments for practicing the invention as defined by the following claims.

What is claimed is:

1. A radiation detector system comprising:
    at least one central radiation detector for converting ionizing radiation into a first signal;
    a plurality of separate satellite radiation detector detectors positioned adjacent to and surrounding the at least one central radiation detector for converting ionizing radiation into a plurality of second signals, each of the satellite radiation detectors having a field of view different than fields of view of the other satellite radiation detectors; and
    a plurality of radiation shields, wherein a radiation shield is disposed between each pair of adjacent satellite radiation detectors to substantially block ionizing radiation originating outside the field of view of each satellite radiation detector wherein the first signal and the second signals represent a spectral fingerprint of an area and spatial distribution of an ionizing radiation source within the area.

2. The system as claimed in claim 1 wherein each of satellite radiation detectors is a spectroscopic radiation detector.

3. The system as claimed in claim 1, wherein the ionizing radiation includes gamma rays and wherein the system is a position-sensitive, compound gamma ray spectrometer.

4. The system as claimed in claim 1 wherein the at least one central radiation detector includes a semiconductor substrate.

5. The system as claimed in claim 1 wherein each of the satellite detectors is a positional detector.

* * * * *

UNITED STATES PATENT AND TRADEMARK OFFICE
CERTIFICATE OF CORRECTION

PATENT NO. : 6,727,505 B2
DATED : April 27, 2004
INVENTOR(S) : Roland R. Benke et al.

It is certified that error appears in the above-identified patent and that said Letters Patent is hereby corrected as shown below:

Column 15,
Line 18, delete "detectors".

Signed and Sealed this

Thirtieth Day of November, 2004

JON W. DUDAS
*Director of the United States Patent and Trademark Office*